United States Patent Office 3,422,111
Patented Jan. 14, 1969

3,422,111
NAPHTHOXIDINE DYESTUFFS AND PROCESS
FOR MAKING SAME
Hans Bosshard, Basel, and Werner Bossard, Riehen,
Switzerland, assignors to J. R. Geigy A.G., Basel,
Switzerland
No Drawing. Filed Aug. 6, 1964, Ser. No. 387,995
Claims priority, application Switzerland, Aug. 8, 1963,
9,830/63
U.S. Cl. 260—270      7 Claims
Int. Cl. C09b *13/00*

ABSTRACT OF THE DISCLOSURE

Naphthoxidine dyes of Formula III (see specification infra) which are valuable for dyeing polymeric and copolymeric acrylonitrile fibers, are prepared by reacting a naphthoxidine of Formula I (see specification infra) in the presence of chlorine or bromine with a heterocyclic-aromatic (e.g. pyridine, quinoline or isoquinoline) nitrogen base.

This invention relates to new naphthoxidine dyestuffs and more particularly to basically substituted naphthoxidines, to a process for making the same, as well as to the dyeing of polymeric and copolymeric acrylonitrile fibers, and, as industrial products, the fibers dyed with these dyestuffs.

It has been found that basically substituted naphthoxidine dyestuffs, which are valuable dyestuffs for the dyeing of polymeric and copolymeric acrylonitrile fibers, are obtained by reacting a naphthoxidine of the formula

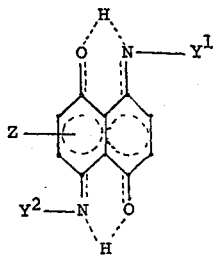

(I)

wherein one of $Y^1$ and $Y^2$ represents hydrogen and the other hydrogen or an organic radical as defined further below and Z represents hydrogen or a substituent as defined further below, which substituents do not participate in the reaction;
in the presence of chlorine or bromine with $n$ mols or an excess thereover of a heterocyclic-aromatic, preferably 5- or 6-membered, nitrogen base of the formula

(II)

in particular pyridine, quinoline or isoquinoline or homologs thereof. The preferred nitrogen base is pyridine.

The nitrogen atom in the 1- or 5-position of the naphthalene structure can contain, as substituent, e.g. unsubstituted or substituted hydrocarbon radicals, in particular phenyl groups which can be substituted, for example, by lower alkoxy groups. Preferably, however, this nitrogen atom is unsubstituted.

The reaction of the naphthoxidine of Formula I with the nitrogen base of Formula II is performed at room temperature (20–30° C.) by introducing chlorine gas or, preferably, by adding bromine to a solution of the two reaction partners, preferably in an organic solvent which is inert to chlorine or bromine, and subsequently heating to about 60 to 100° C., preferably to 70 to 80° C. Suitable solvents are halogenated lower hydrocarbons of the aliphatic series such as chloroform, carbon tetrachloride or tetrachloroethane, or of the aromatic series such as chlorobenzenes, or aromatic nitrohydrocarbons, in the latter case preferably nitrobenzene.

By the above-described reaction there is obtained a cycloammonium-substituted naphthoxidine dyestuff of the formula

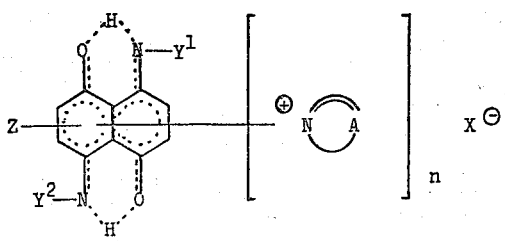

(III)

wherein $Y^1$ and $Y^2$ have the meanings given hereinbefore and more in detail hereinafter, Z has the same meaning as given above,

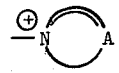

represents the quaternized radical of the compound of Formula II,
$X^\ominus$ represents a chlorine or bromine ion, depending on whether chlorine or bromine had been used in the above-described reaction, and
$n$ is one of the integers 1 and 2.

The end products are crystalline chlorides or bromides. They can be isolated as such or, advantageously they can be modified into the double salts, e.g. zinc chloride double salts. Such salts are distinguished by their good crystallinity and can be used directly for dyeing.

The dyestuffs of Formula III can be converted by reaction with a strong mineral acid to the corresponding perchlorates, sulfonates, nitrates and the like. In such salts, $X^\ominus$ in Formula III represents, in particular, the anion of a strong inorganic acid, for example $ClO_4^-$, $SO_4^{2-}$, $NO_3^-$ or $ZnCl_3^-$.

Examples of substituents Z at the naphthalene structure in the naphthoxidines of Formulas I and III are halogen, particularly chlorine or bromine, or hydrocarbon radicals such as alkyl radicals, particularly those having 1 to 4 carbon atoms, or aryl radicals which may be substituted, preferably phenyl radicals. As substituents, the latter can contain e.g. halogens such as fluorine, chlorine or bromine, the nitro or trifluoromethyl group, or carbamyl or sulfamyl or these two substituted by lower alkyl hydroxy-lower alkyl, lower alkoxy-lower alkyl and/or phenyl at the nitrogen atom, or hydrocarbon sulfonyl groups such as the methylsulfonyl, ethylsulfonyl or phenylsulfonyl group.

When one of $Y^1$ and $Y^2$ represents an organic radical, the latter is phenyl, lower alkoxy-phenyl, lower alkylphenyl, bromophenyl, chlorophenyl, hydroxy-lower alkyl-phenyl, lower alkoxy-lower alkyl-phenyl or lower alkoxy-carbonyl-phenyl.

Naphthoxidines of Formula I, usable in the process according to the invention are known (cf. U.S. Patent 2,555,973 and Spanish Patent 282,486) or can be produced by methods known per se, for example by partially reducing 1,5-dinitronaphthalenes substituted in the 2-, 3-, 6- or 7-position, with sulfur sesquioxide or also by subsequently substituting, e.g. brominating, naphthoxidine. Naphthoxidines substituted at the naphthalene nucleus by aromatic groups are obtained by reacting naphthoxidine with corresponding aromatic diazonium compounds while splitting off nitrogen.

The new basically substituted naphthoxidines are dark-colored crystalline substances having a bronze surface gloss. They dissolve easily in water and they produce beautiful reddish blue to blue-green dyeings on polymeric and copolymeric acrylonitrile fibers, advantageously on material of which at least 80% consists of polyacrylonitrile. These dyeings have good fastness properties, in particular excellent fastness to light and decatizing.

The aforesaid acrylonitrile fibers and textiles are dyed advantageously at the boil, optionally under pressure, in a pH range which can vary, for example, from 2 to 9 but which is preferably between 3 and 5. Under the usual dyeing conditions, the baths, to which if necessary also non-ionogenic wetting or dispersing and/or levelling agents or carriers have been added, are practically exhausted within the normal dyeing times.

The dyestuffs according to the invention can also be used for the dyeing of leather and paper.

Particularly good dyeings are obtained with those of the new naphthoxidine dyestuffs of Formula III in which the radical

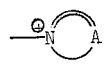

is of the formula

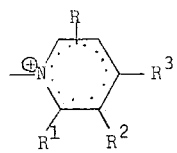

wherein each of R, $R^1$, $R^2$ and $R^3$ represents independently hydrogen or methyl, or the aforesaid radical is of the formula

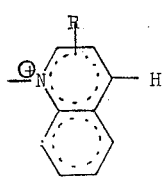

or it is of the formula

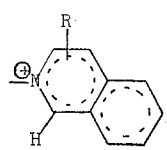

in which formulas R has the meaning given above.

The invention is further illustrated by the following non-limitative examples. Where not otherwise expressly stated, parts are given as parts by weight. The temperatures are in degrees centigrade. The relationship of parts by weight to parts by volume is as that of grams (g.) to milliliters (ml.).

EXAMPLE 1

10.0 parts of naphthoxidine in the form of its zinc chloride complex are dissolved in 150 parts of hot nitrobenzene and 40 parts of pyridine. The mixture is cooled to 20° and at this temperature 7.5 parts of bromine are added dropwise within about 1 hour whereupon the temperature is raised to 75°. After stirring for three hours at the latter temperature, the reaction mixture is cooled and the precipitated naphthoxidine pyridinium bromide is filtered off. This is dissolved in 800 parts of water and 4 parts of hydrochloric acid at 50°, the solution is clarified by filtration and the dyestuff is precipitated therefrom by the addition of 80 parts of zinc chloride. It is obtained in the form of fine black-blue crystals which correspond to the formula

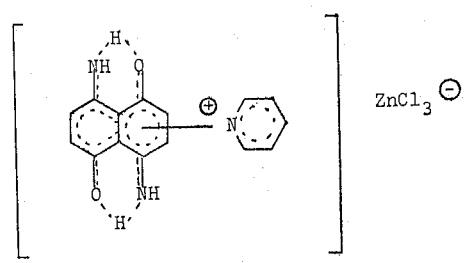

The dyestuff easily dissolves in water with a deep blue color and, from a weakly acetic acid bath, it dyes polyacrylonitrile fibers in a pure blue shade. The dyeing has very good fastness to light, decatizing and washing.

EXAMPLE 2

10 parts of naphthoxidine in the form of its zinc chloride complex are dissolved while heating in 160 parts of nitrobenzene and 45 parts of pyridine. The solution is cooled to about 15°, and at this temperature 4 parts of chlorine gas are slowly conducted for about 30 minutes into the reaction mixture while stirring until a spot test on filter paper shows that the reaction product has almost completely precipitated. Stirring is continued for 5 hours at a temperature of 65°, then the mixture is cooled to room temperature and the separated dyestuff is filtered off. For purification, the filtrate is dissolved at 60° in 600 parts of water and 3 parts of hydrochloric acid, and is filtered. The filtrate is mixed with 20 parts of concentrated hydrochloric acid and 60 parts of sodium chloride and cooled. The pyridinium chloride compound of the formula

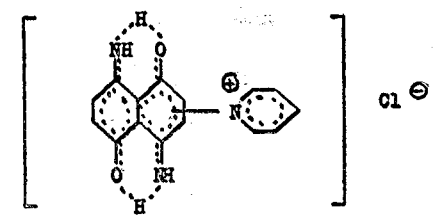

separated in crystal form is filtered off and dried.

From a weakly acid bath it dyes polyacrylonitrile fibres in a pure blue shade. The dyeing has excellent fastness to light, washing and decatising.

EXAMPLE 3

If, instead of the 40 parts of pyridine in Example 1, the same amount of quinoline is used and otherwise the procedure is the same as described in Example 1, then a blue dyestuff of the formula

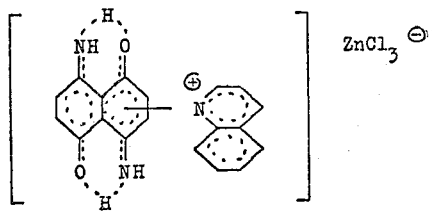

is obtained which has similar properties as in the two foregoing examples.

If in Example 1, the 10 parts of naphthoxidine are replaced by corresponding amounts of the naphthoquinone imine compounds given in the following Table I then, with otherwise the same procedure, blue to blue-green dyestuffs are obtained which have similar properties.

TABLE I

| Example No. | naphthoxidine | produced | shade of dyeing on polyacrylonitrile fibers |
|---|---|---|---|
| 4 | 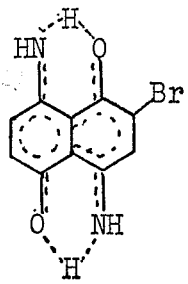 | by bromination of naphthoxidine | greenish blue |
| 5 | 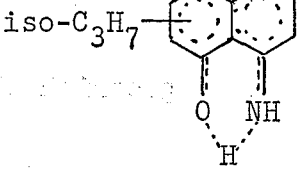 | by reaction of naphthoxidine with isopropanol in concentrated sulfuric acid | blue |
| | 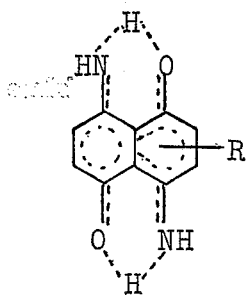 | by reacting the diazonium compounds $R - N_2^+$ with naphthoxidine with splitting off of nitrogen | |
| | wherein | | |
| 6 | R is 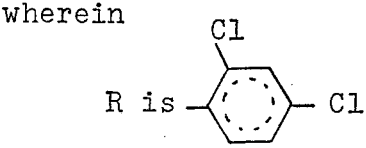 | | reddish blue |
| 7 | R is 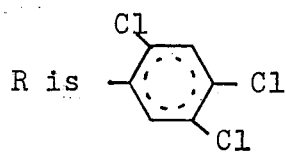 | | greenish blue |

TABLE 1—Continued
| Example No. | naphthoxidine produced | shade of dyeing on polyacrylonitrile fibers |
|---|---|---|
| 8 | R is 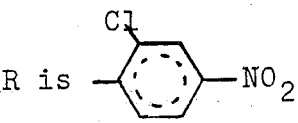 | greenish blue |
| 9 | R is 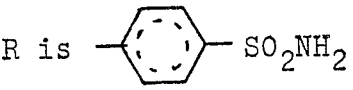 | greenish blue |
| 10 | R is 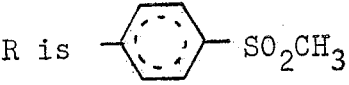 | greenish blue |
| 11 | R is  | blue |
| 12 | R is 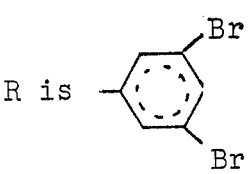 | blue |
| 13 | R is 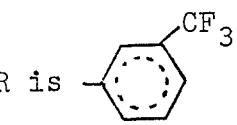 | blue |
| 14 | R is  | blue |

TABLE 1—Continued
| Example No. | naphthoxidine produced | shade of dyeing on polyacrylonitrile fibers |
|---|---|---|
| 15 | R is 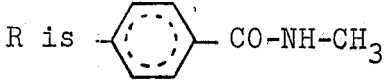 | blue |
| 16 | R is 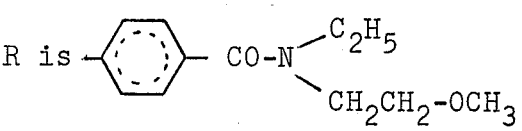 | blue |
| 17 | R is 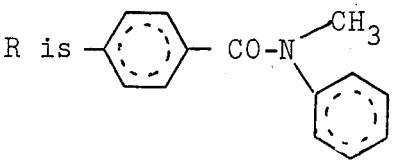 | blue |
| 18 | R is 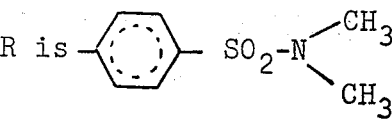 | blue |
| 19 | R is 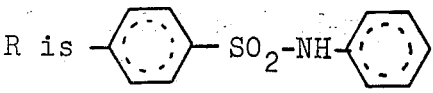 | blue |
| 20 | R is 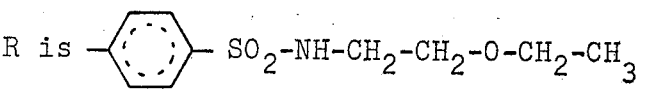 | blue |
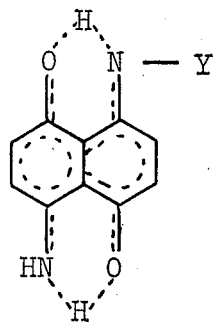
by condensing the following aminobenzenes with naphthoxidine:

TABLE 1—Continued

| Example No. | naphthoxidine | | produced | shade of dyeing on polyacrylonitrile fibers |
|---|---|---|---|---|
| 21 | Y is | 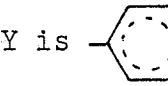 —OC$_2$H$_5$ | p-ethoxy-aniline | blue-green |
| 22 | Y is | 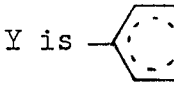 | aniline | blue-green |
| 23 | Y is | 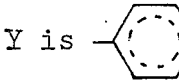 —CH$_3$ | p-methyl-aniline | blue-green |
| 24 | Y is | 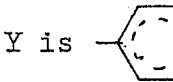 —Cl | p-chloro-aniline | blue-green |
| 25 | Y is | 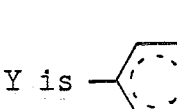 (Br) | m-bromo-aniline | blue-green |
| 26 | Y is | 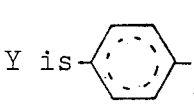 —CH$_2$—CH$_2$OH | p-(β-hydroxyethyl)-aniline | blue-green |
| 27 | Y is |  —CH$_2$—CH$_2$—OCH$_3$ | p-(β-methoxyethyl)-aniline | blue-green |
| 28 | Y is | 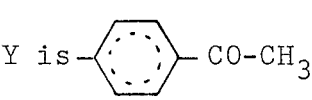 —CO—CH$_3$ | p-acetyl-aniline | blue-green |

EXAMPLE 29

10 parts of naphthoxidine in the form of its zinc chloride complex are dissolved in 200 parts of tetrachloroethane and 50 parts of pyridine. 16 parts of bromine are added dropwise at 20–30° and the reaction mixture is then kept for 4 hours at a temperature of 60–70°.

The dyestuff is isolated as described in Example 1. A finely crystallised, shimmering product of the formula

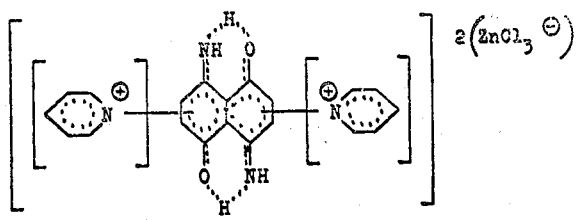

is obtained which is easily dissolved in water with a deep blue colour. From a weakly acetic acid bath it dyes polyacrylonitrile fibres pure blue. The dyeings are distinguished by a greener shade than those of Example 1 and they also have very good fastness to light and decatising.

If in the above example, with otherwise the same procedure, the corresponding amounts of β- or γ-picoline are used instead of pyridine, then dyestuffs having similar properties are obtained.

EXAMPLE 30

11.5 parts of a compound of the formula

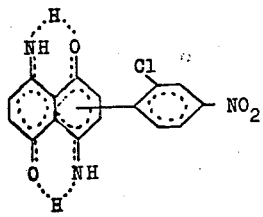

which is obtained by reacting the diazonium compound of 2-chloro-4-nitraniline with naphthoxidine whereby nitrogen is split off, are dissolved with heating in 220 parts of o-dichlorobenzene and 50 parts of pyridine and then cooled to 20°. Then, within about 1 hour while stirring, 8 parts of bromine dissolved in 20 parts of o-dichlorobenzene are added dropwise into the solution. The temperature is raised slowly to 80°, the reaction mixture is left to react for 6 hours at this temperature, and then it is cooled to room temperature. The separated crude product is filtered off, then dissolved at 80° in 750 parts of water and 3 parts of sulfuric acid, and filtered to remove insoluble impurities. After the filtrate has been mixed with 10 parts of sulfuric acid and 75 parts of sodium sulfate, the pyridinium sulfate having the following formula

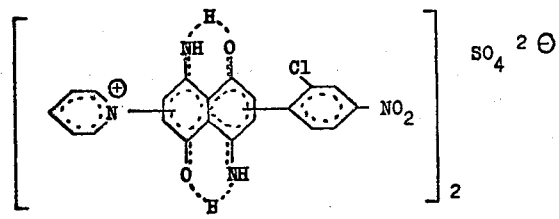

is obtained in the form of crystals of a very dark blue colour.

The dyestuff dissolves in water with a deep blue colour, and, from a weakly acetic acid bath, dyes polyacrylonitrile fibres in a clear greenish-blue shade. The dyeing has a very good fastness to light and decatising.

When 10 parts of sodium perchlorate are used instead of sulfuric acid and sodium sulfate to precipitate the pyridinium compound from the aqueous solution according to the above example, the corresponding pyridinium perchlorate is obtained which has low water solubility.

EXAMPLE 31

1.0 parts of the dyestuff according to Example 1 are slurried with 1.0 part of 80% acetic acid and then 4000 parts of water is added. Two parts of sodium acetate, 1 part of 80% acetic acid and 4 parts of a condensation product of olein alcohol and 15 mols of ethylene oxide are added to the solution obtained. 100 parts of Orlon 42 (polyacrylonitrile fibre made by E. I. du Pont, Wilmington, Del., U.S.A.) are introduced at 50°, the temperature is raised within 15 minutes to 100° and dyeing is performed at the boil for 1 hour. At the end of this time, the dye liquor is practically completely exhausted. The goods are thoroughly soaped, washed and dried. Pure blue coloured Orlon 42 fibre is obtained which has excellent fastness to washing, light and decatising.

EXAMPLE 32

0.5 part of the dyestuff prepared as described in Example 1 is added to a solution of 4 parts of a condensation product of hexadecyl-diethylenetriamine and 20 mols of ethylene oxide in 4000 parts of water, said solution having a temperature of about 50°. The pH of the dyebath so obtained is about 6.5. 100 parts of a polyacrylonitrile fiber material similar to that used in the preceding example, such as Dralon fiber, are introduced at 40°, the temperature is raised within 15 minutes to 95 to 100° and then dyeing is performed for 30 minutes at the boil. The goods are soaped, rinsed and dried. In this way, Dralon fibers dyed vivid blue are obtained which are excellently fast to washing and light.

We claim:
1. A process for producing β-cycloammonium naphthoxidine salts of strong acids, comprising
   (a) mixing at room temperature a naphthoxidine of the formula

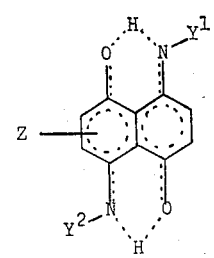

wherein
one of $Y^1$ and $Y^2$ is hydrogen and the other Y is a member selected from the group consisting of phenyl, lower alkoxy-phenyl, lower alkylphenyl, bromophenyl, chlorophenyl, hydroxy-lower alkyl-phenyl, lower alkoxy-lower alkyl-phenyl, lower alkoxy-carbonyl-phenyl and hydrogen;
Z is a member selected from the group consisting of hydrogen, alkyl of from 1 to 4 carbon atoms, phenyl, fluoro phenyl, chlorophenyl, bromophenyl, nitrophenyl, trifluoromethylphenyl, carbamylphenyl, sulfamylphenyl, lower alkylcarbamylphenyl, lower alkylsulfamylphenyl, hydroxy-lower alkylcarbamylphenyl, hydroxy-lower alkylsulfamylphenyl, lower alkoxy-lower alkylcarbamylphenyl, lower alkoxy-lower alkylsulfamylphenyl, phenylcarbamylphenyl, phenylsulfamylphenyl, methylsulfonylphenyl, ethylsulfonylphenyl and phenylsulfonylphenyl;

with an at least equimolar amount of a heterocyclic aromatic compound of the formula

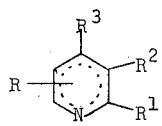

wherein each of R, R¹, R² and R³ is a member of the group consisting of hydrogen and methyl, taken independently, R¹ and R² taken together with the carbon atoms to which they are attached form a six-membered aromatic ring, with R³ being hydrogen, and R² and R³ taken together with the carbon atoms to which they are attached form a six-membered aromatic ring with R¹ being hydrogen, and with an excess of a solvent selected from the group consisting of lower halogeno-alkanes, halogeno-benzenes and nitrobenzene, (b) introducing into the mixture, per mol of heterocyclic aromatic compound to be reacted with each mol of naphthoxidine two equivalents of a halogen of one of the atom numbers 17 and 35, (c) then heating the resulting mixture to a temperature of about 60 to 100° C., and (d) recovering the resulting dyestuff of the formula

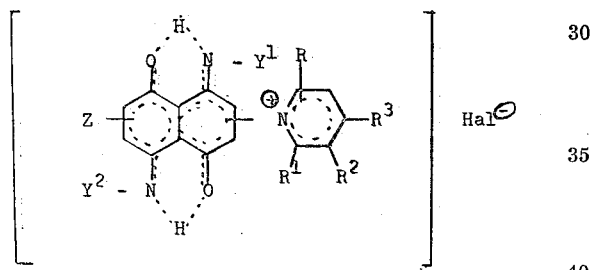

wherein Hal is a halogen ion of the halogen used in step (b) and R, R¹, R², R³, Y¹, Y² and Z have the above given meanings.

2. A cycloammonium naphthoxidine dyestuff of the formula

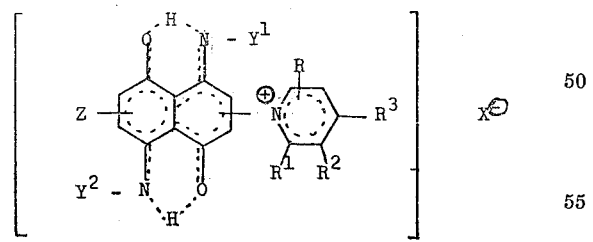

wherein each of R, R¹, R² and R³ is a member of the group consisting of hydrogen and methyl, taken independently, R¹ and R² taken together with the carbon atoms to which they are attached form a six-membered aromatic ring, with R³ being hydrogen, and R² and R³ taken together with the carbon atoms to which they are attached form a six-membered aromatic ring with R¹ being hydrogen;

X represents the anion of an acid;

one of Y¹ and Y² is hydrogen and the other Y is a member selected from the group consisting of hydrogen, phenyl, lower alkoxy-phenyl, lower alkyl-phenyl, bromophenyl, chlorophenyl, hydroxy-lower alkyl-phenyl, lower alkoxy-lower alkyl-phenyl, and lower alkoxy-carbonyl-phenyl; and Z is a member selected from the group consisting of 4, alkyl of from 1 to 4 carbon atoms, phenyl, fluoro-phenyl, chlorophenyl, bromophenyl, nitrophenyl, trifluoromethylphenyl, carbamylphenyl, sulfamylphenyl, lower alkylcarbamylphenyl, lower alkylsulfamylphenyl, hydroxy-lower alkylcarbamylphenyl, hydroxy-lower alkylsulfamylphenyl, lower alkoxy-lower alkylcarbamylphenyl, lower alkoxy-lower alkylsulfamylphenyl, phenylcarbamylphenyl, phenylsulfamylphenyl, methylsulfonylphenyl, ethylsulfonylphenyl and phenylsulfonylphenyl.

3. A dyestuff of the formula

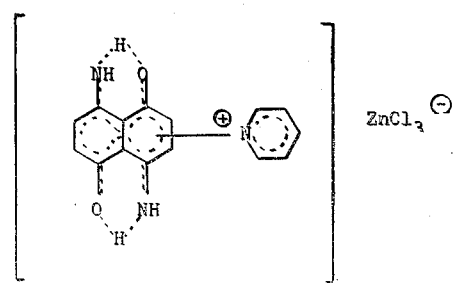

4. A dyestuff of the formula

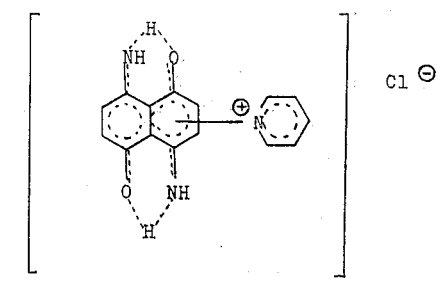

5. A dyestuff of the formula

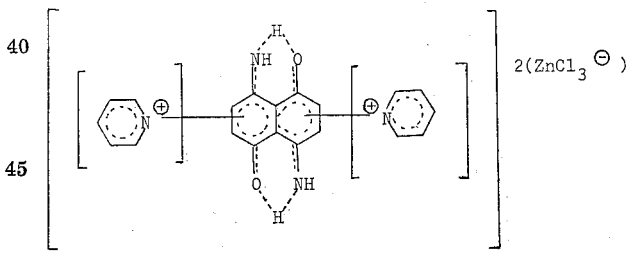

6. A dyestuff of the formula

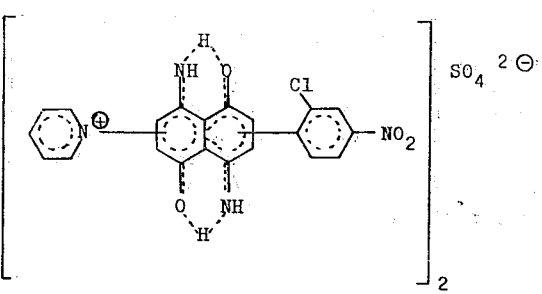

7. A cycloammonium naphthoxidine dyestuff of the formula

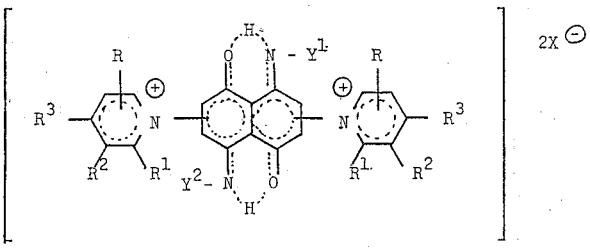

wherein
each of R, R¹, R² and R³ is a member of the group consisting of hydrogen and methyl, taken independently, R¹ and R² taken together with the carbon atoms to which they are attached form a six-membered aromatic ring, with R³ being hydrogen, and R² and R³ taken together with the carbon atoms to which they are attached form a six-membered aromatic ring with R¹ being hydrogen;

X⊖ represents the anion of an acid;

one of Y¹ and Y² is hydrogen and the other Y is a member selected from the group consisting of hydrogen, phenyl, lower alkoxy-phenyl, lower alkyl-phenyl, bromophenyl, chlorophenyl, hydroxy-lower alkyl-phenyl, lower alkoxy-lower alkyl-phenyl, and lower alkoxy-carbonyl-phenyl.

References Cited

UNITED STATES PATENTS

| | | | |
|---|---|---|---|
| 2,311,032 | 2/1943 | Dickey et al. | 260—296 |
| 2,772,274 | 11/1956 | Schmitdtnickels | 260—272 XR |
| 2,555,973 | 6/1951 | Kartaschoff | 260—396 |

FOREIGN PATENTS

| | | |
|---|---|---|
| 1,012,800 | 12/1965 | Great Britain. |
| 282,486 | 1963 | Spain. |

NICHOLAS S. RIZZO, *Primary Examiner.*

DONALD G. DAUS, *Assistant Examiner.*

U.S. Cl. X.R.

260—286, 296, 396; 8—55, 7, 12; 260—645, 556, 577, 578